US011871499B2

(12) United States Patent
Baldo et al.

(10) Patent No.: US 11,871,499 B2
(45) Date of Patent: Jan. 9, 2024

(54) INDUCTION COOKING APPARATUS WITH HEATSINK AND METHOD OF ASSEMBLY

(71) Applicant: Whirlpool Corporation, Benton Harbor, MI (US)

(72) Inventors: Salvatore Baldo, Varese (IT); Andrea Gallivanoni, Casorate Sempione (IT); Ajit Manohar, Nagpur (IN); Cristiano Vito Pastore, Borgomanero (IT)

(73) Assignee: Whirlpool Corporation, Benton Harbor, MI (US)

( * ) Notice: Subject to any disclaimer, the term of this patent is extended or adjusted under 35 U.S.C. 154(b) by 500 days.

(21) Appl. No.: 17/090,060

(22) Filed: Nov. 5, 2020

(65) Prior Publication Data

US 2022/0141926 A1 May 5, 2022

(51) Int. Cl.
*H05B 6/12* (2006.01)
*H05B 6/36* (2006.01)

(52) U.S. Cl.
CPC ............. *H05B 6/1245* (2013.01); *H05B 6/36* (2013.01); *H05B 2206/02* (2013.01)

(58) Field of Classification Search
CPC .......... H05B 2206/02; H05B 2206/022; H05B 6/1245; H05B 6/1263; H05B 6/36
See application file for complete search history.

(56) References Cited

U.S. PATENT DOCUMENTS

| | | | | |
|---|---|---|---|---|
| 5,428,207 | A | 6/1995 | Essig et al. | |
| 5,430,273 | A * | 7/1995 | Bogdanski | H05B 6/062 336/222 |
| 7,786,414 | B2 | 8/2010 | Schilling et al. | |
| 8,003,924 | B2 | 8/2011 | Kim et al. | |
| 8,281,558 | B2 | 10/2012 | Hiemeyer et al. | |
| 8,853,599 | B2 | 10/2014 | Kusaka et al. | |
| 8,884,197 | B2 | 11/2014 | Gagas et al. | |
| 9,241,374 | B2 | 1/2016 | Matsui et al. | |
| 10,477,629 | B2 | 11/2019 | Park et al. | |

(Continued)

FOREIGN PATENT DOCUMENTS

| | | | |
|---|---|---|---|
| BE | 1013307 | A3 | 11/2001 |
| BR | 102016004814 | A2 | 12/2016 |

(Continued)

OTHER PUBLICATIONS

European Search Report for EP21206257, dated Mar. 14, 2022 (66 Pages).

*Primary Examiner* — Dana Ross
*Assistant Examiner* — Joe E Mills, Jr.
(74) *Attorney, Agent, or Firm* — Harness, Dickey & Pierce, PLC

(57) ABSTRACT

An induction cooking apparatus including a coil beam assembly, an inverter assembly, and a heatsink. The coil beam assembly includes one or more induction coils. The inverter assembly includes a first circuit board that is electrically connected to the induction coil(s) such that the inverter assembly is configured to supply electricity to the induction coil(s). The heatsink has a beam-like structure and is attached to both the coil beam assembly and the inverter assembly. The heatsink is positioned above the inverter assembly and below the coil beam assembly such that the heatsink is the sole support structure for the inverter assembly. A method for assembling the induction cooking apparatus is also described.

20 Claims, 11 Drawing Sheets

(56) References Cited

U.S. PATENT DOCUMENTS

| | | | | |
|---|---|---|---|---|
| 2008/0185376 | A1* | 8/2008 | Gagas | H05B 6/1263 219/623 |
| 2011/0047934 | A1 | 3/2011 | Brown | |
| 2018/0339490 | A1 | 11/2018 | Park et al. | |
| 2019/0297680 | A1 | 9/2019 | Parachini et al. | |
| 2019/0297688 | A1* | 9/2019 | Parachini | F24C 7/06 |
| 2019/0306928 | A1 | 10/2019 | Choi et al. | |

FOREIGN PATENT DOCUMENTS

| | | | |
|---|---|---|---|
| EP | 1844630 | A1 | 10/2007 |
| EP | 2578058 | A1 | 4/2013 |
| EP | 3139702 | A1 | 3/2017 |
| EP | 3030042 | B1 | 8/2017 |
| EP | 3544377 | A1 | 9/2019 |
| EP | 3544379 | A1 | 9/2019 |
| EP | 3651550 | A1 | 5/2020 |
| JP | 5083364 | B2 | 11/2012 |
| JP | 5103445 | B2 | 12/2012 |
| JP | 2014135119 | A | 7/2014 |
| JP | 5677240 | B2 | 2/2015 |
| JP | 2015049960 | A | 3/2015 |
| JP | 2016131160 | A | 7/2016 |
| JP | 6198884 | B2 | 9/2017 |
| JP | 2018073844 | A | 5/2018 |
| KR | 20060026251 | A | 3/2006 |
| NZ | 337936 | A | 8/2001 |
| WO | 2008103009 | A1 | 8/2008 |
| WO | 2013064396 | A1 | 5/2013 |
| WO | 2017151750 | A1 | 9/2017 |
| WO | 2019139251 | A1 | 7/2019 |

* cited by examiner

218'
56'
208'

204'
214'
210'
218'
212'
206'
178'

INDUCTION COOKING APPARATUS WITH HEATSINK AND METHOD OF ASSEMBLY

FIELD

The present disclosure relates generally to cooktops, including for example induction cooktops used in residential and commercial kitchens, and associated assembly methods.

BACKGROUND

The statements in this section merely provide background information related to the present disclosure and may not constitute prior art.

Induction cooktops are kitchen appliances that exploit the phenomenon of induction heating for food cooking purposes. Conventional induction cooktops include a cooktop panel that is made of glass or a glass-ceramic material. In use, cookware such as pots and pans are positioned on the cooktop panel. Induction cooktops operate by generating an electromagnetic field in a cooking region above the cooktop panel. The electromagnetic field is generated by one or more induction coils made of copper wire, which are driven by an inverter that supplies an oscillating electric current to the induction coils. The electromagnetic field induces a parasitic current inside a pot or pan positioned in the cooking region. In order to efficiently heat food utilizing the electromagnetic field, the pot or pan should be made of an electrically conductive ferromagnetic material. The parasitic current circulating in the pot or pan produces heat by Joule effect dissipation. As such, heat is generated only within the pot or pan without directly heating the cooktop panel upon which the pot or pan is placed.

Induction cooktops have a better efficiency than electric cooktops. For example, heating cookware via induction provides for a greater fraction of absorbed energy that is converted into heat that heats the cookware. In operation, the presence of the cookware on the cooktop causes magnetic flux close to the pot or pan resulting in cooking energy being transferred to the cookware.

SUMMARY

This section provides a general summary of the disclosure, and is not a comprehensive disclosure of its full scope or all of its features.

In accordance with one aspect of the present disclosure, an induction cooking apparatus is described, where the induction cooking apparatus includes a coil beam assembly, an inverter assembly, and a heatsink, which together form a burner sub-assembly. The coil beam assembly includes one or more induction coils. The inverter assembly includes a first circuit board that is electrically connected to the induction coil(s) such that the inverter assembly is configured to supply electricity to the induction coil(s). The heatsink has a beam-like structure and is attached to both the coil beam assembly and the inverter assembly. The heatsink, which may have one or more fins for cooling, is positioned above the inverter assembly and below the coil beam assembly. The inverter assembly is mounted beneath the heatsink such that the heatsink is the sole support structure for the inverter assembly. As a result, the heatsink is load bearing. In other words, the induction cooking apparatus of the present disclosure takes full advantage of the rigidity of the heatsink's beam-like structure and utilizes it to support the inverter assembly at a position below the coil beam assembly. This limits bending of the coil beam assembly and solves the problem of the coil beam bending at its center. This added rigidity solves problems that can arise when temperature and/or manufacturing variances result in improper spacing between the coil beam assembly and other components of the induction cooking apparatus, such as the inverter assembly and/or cooktop panel. The induction cooking apparatus of the present disclosure also can provide a burner sub-assembly of reduced height compared to existing designs, which requires less space and can have resulting packing benefits.

In accordance with another aspect of the present disclosure, a method of assembling the induction cooking apparatus described above is disclosed. The method includes the steps of: fixably mounting a lower end of the heatsink to the inverter assembly and fixably mounting the coil beam assembly to an upper end of the heatsink. As such, the heatsink forms the sole support structure for the inverter assembly and is load bearing. The method further includes the step of electrically connecting the induction coil(s) to the inverter assembly. Finally, the method proceeds with installing the burner sub-assembly in a burner box such that the inverter assembly is suspended above a bottom wall of the burner box and then installing a cooktop panel over the burner box and the burner sub-assembly at a position above the induction coil(s). Advantageously, this assembly method can be completed quickly and easily and eliminates certain steps and components associated with the assembly of traditional induction cooktops and reduces the likelihood of alignment errors.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
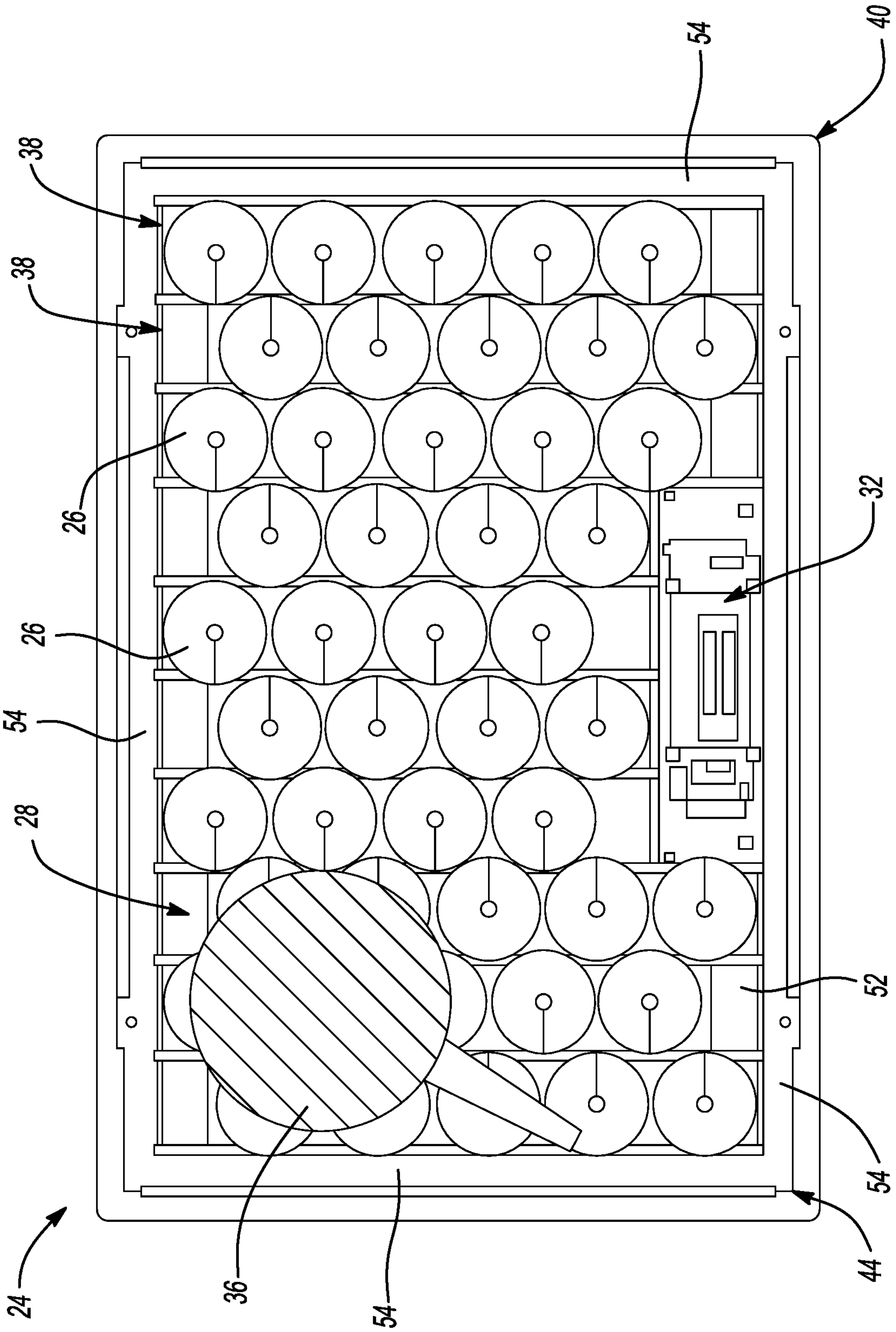
FIG. 1 is a top plan view of an exemplary cooktop.

Referring to the Figures, wherein like numerals indicate corresponding parts throughout the several views, an induction cooking apparatus 20 and burner sub-assembly 22 for a cooktop 24 are illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 3:
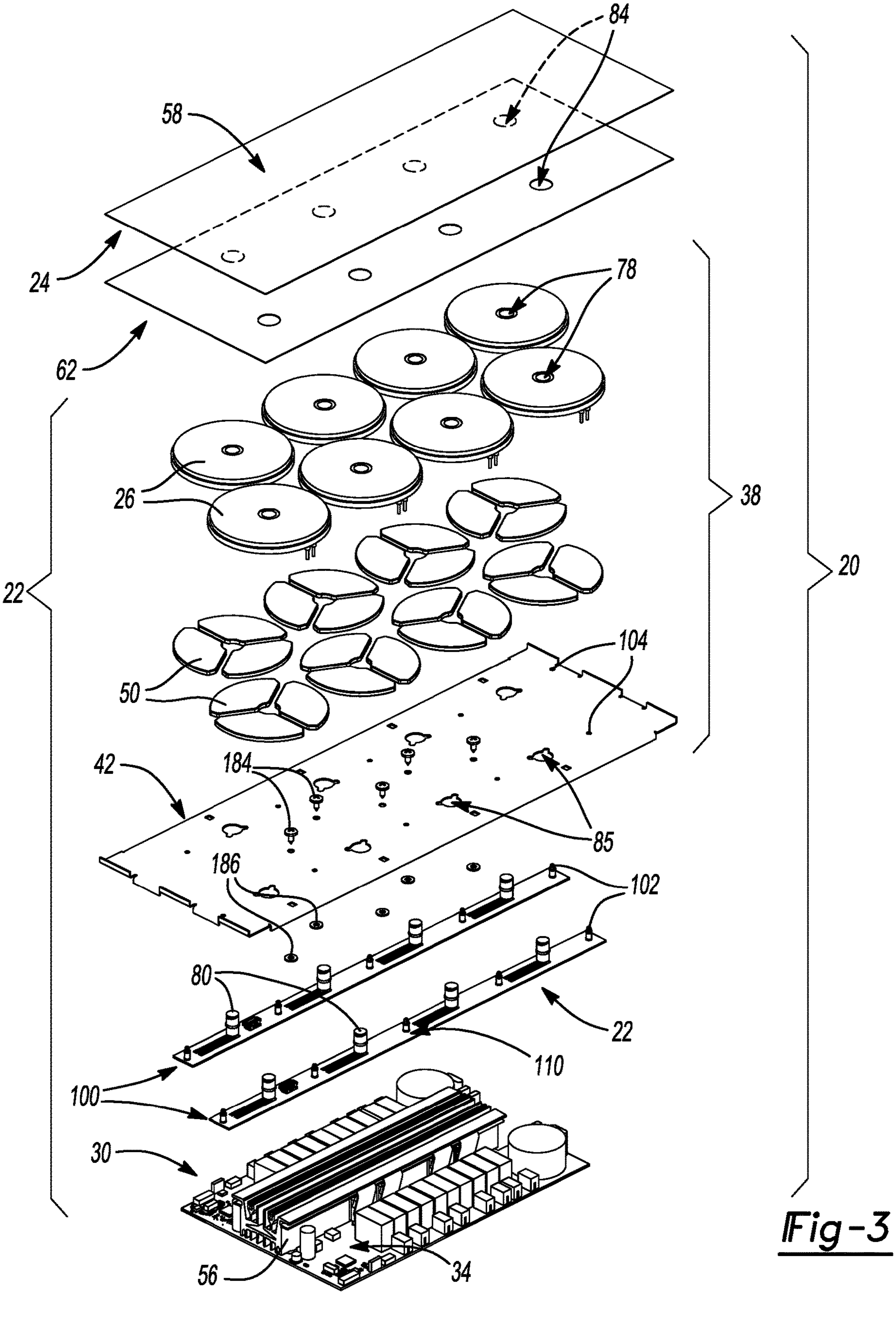
FIG. 3 is an exploded perspective view of an exemplary cooktop panel, inverter assembly, heatsink, and the exemplary coil beam assembly illustrated in FIG. 2.
Figure 4:
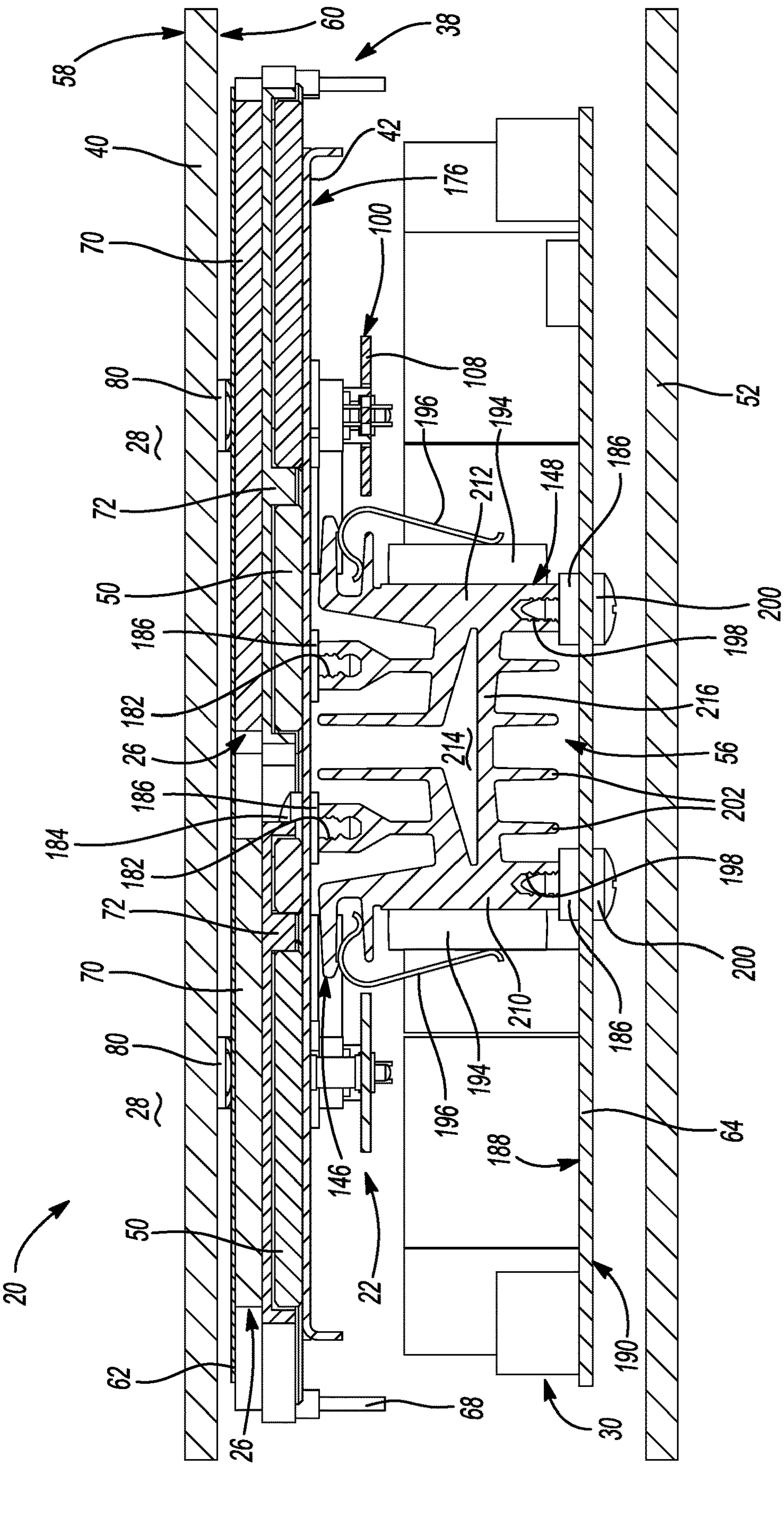
FIG. 4 is a front cross-sectional view of the exemplary cooktop panel, inverter assembly, heatsink, and coil beam assembly illustrated in FIG. 3.

For purposes of description herein the terms "upper," "lower," "top," "bottom," "vertical," "horizontal," and derivatives thereof shall relate to the device as oriented in FIGS. 3 and 4. However, it is to be understood that the apparatus and assemblies described herein may assume various alternative orientations.

Figure 2:
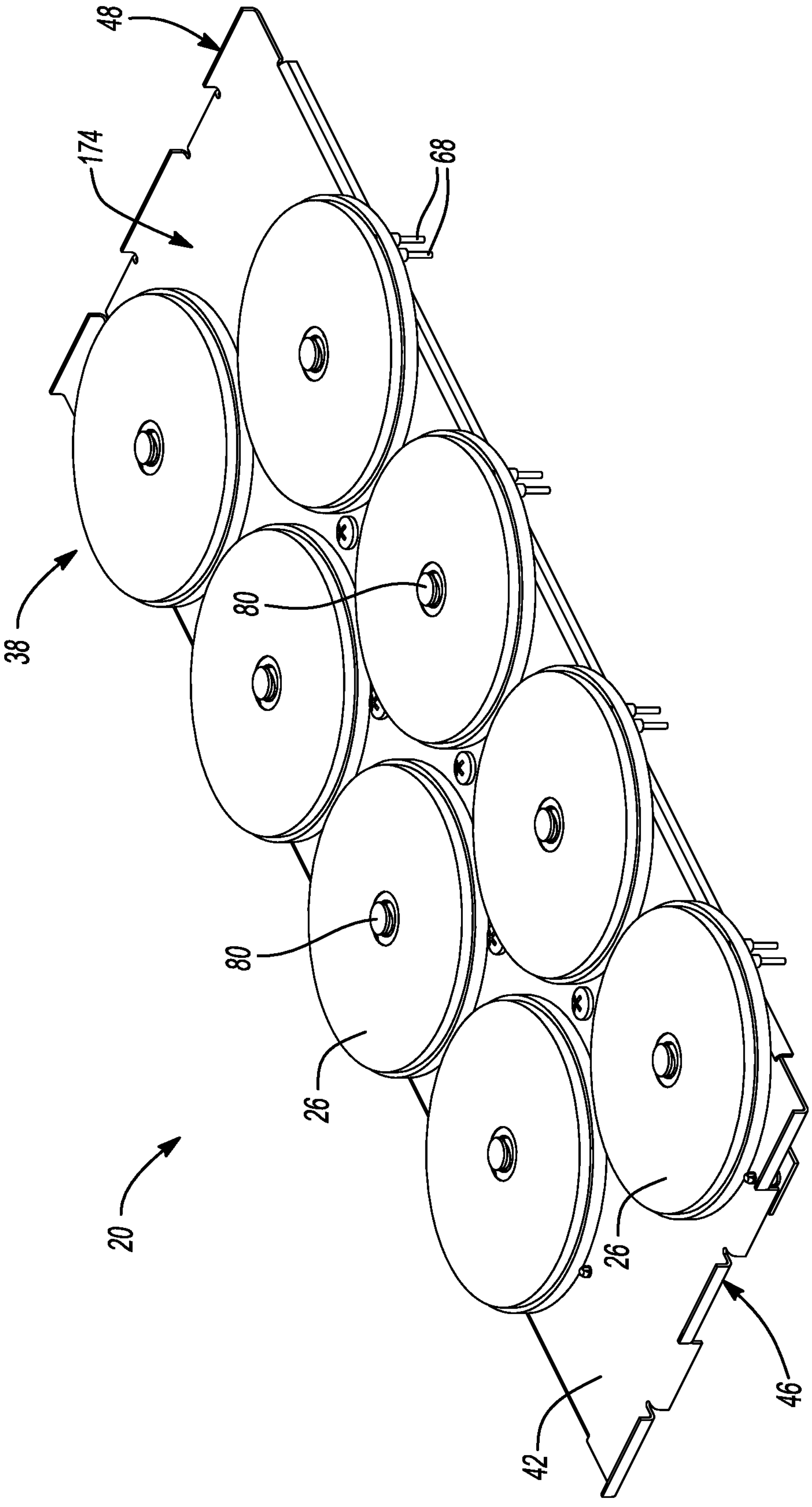
FIG. 2 is a top perspective view of an exemplary coil beam assembly that is constructed in accordance with the teachings of the present disclosure.

Referring to FIGS. 1-3, the cooktop 24 is shown, as seen from above. In the illustrated embodiment, the cooktop 24 is an induction cooktop that includes an array of induction coils 26 distributed over a cooking region 28. The induction coils 26 are electrically connected to an inverter assembly 30. The inverter assembly 30 is configured to supply electricity to the induction coils 26. In other words, the inverter assembly 30 can selectively activate (i.e. turn on and turn off) the induction coils 26 in response to an input to a user interface 32 that is electrically connected to the inverter assembly 30. Optionally, the inverter assembly 30 may activate one or more cooking regions 28 formed by the induction coils 26 in response to an input or user selection. As such, the inverter assembly 30 may comprise a first electrical circuit 34 that is configured to supply electricity to the induction coils 26. The first electrical circuit 34 may include switching devices (e.g. solid state switches) that are configured to generate variable frequency/variable amplitude electric current that is fed to the induction coils 26. In this configuration, the induction coils 26 may be driven such that an electromagnetic field is generated to heat cookware 36 (e.g., pans, pots, etc.) that is placed in an activated cooking region 28.

In some embodiments, the induction coils 26 may be independently activated (i.e., turned on) by the inverter assembly 30. Activation of the induction coils 26 may be in response to a user defined heat setting received via the user interface 32 in conjunction with a detection of cookware 36 in the cooking region 28. In response to the user defined setting and the detection of the cookware 36, the inverter assembly 30 may activate the induction coils 26 that are covered or partially covered by the cookware 36. Accordingly, the cooktop 24 may provide for the cooking region(s) 28 to be selectively energized providing for a plurality of flexible cooking regions or zones that is sometimes referred to as "cook anywhere" functionality.

The user interface 32 may include one or more of the following components, a dial, touchpad, a digital read out, a digital display, and a touchscreen display. For example, the user interface 32 may correspond to a touch interface configured to perform heat control and selection of the induction coils 26 for a cooking operation. The user interface 32 may comprise a plurality of sensors configured to detect the presence of a finger of an operator proximate thereto. The sensors of the user interface 32 may correspond to various forms of sensors. For example, the sensors of the user interface may correspond to capacitive, resistive, and/or optical sensors. In some embodiments, the user interface 32 may further comprise a display configured to communicate at least one function of the cooktop 24. The display may correspond to various forms of displays, for example, a light emitting diode (LED) display, a liquid crystal display (LCD), etc. In some embodiments, the display may correspond to a segmented display configured to depict one or more alpha-numeric characters to communicate a cooking function of the cooktop 24. The display may further be operable to communicate one or more error messages or status messages from the inverter assembly 30.

In some embodiments, the induction coils 26 may be grouped to form coil beam assemblies 38. The coil beam assemblies 38 may be arranged in an alternating, staggered, or complementary arrangement comprising a plurality of coil beam assemblies 38 that are favorably arranged to position the induction coils 26 at evenly spaced or distributed locations in the array. Such even spacing allows the induction coils 26 to evenly distribute cooking energy over the cooking region(s) 28.

As discussed herein, the cooktop 24 may comprise a variety of novel components, both structural and electrical, that provide for improved quality and performance, ease of manufacturing benefits, and cost savings. Though the cooktop 24, induction cooking apparatus 20, and burner sub-assembly 22 described herein are discussed in reference to specific examples, various components of these assemblies may be implemented alone or in combination.

Figure 5:
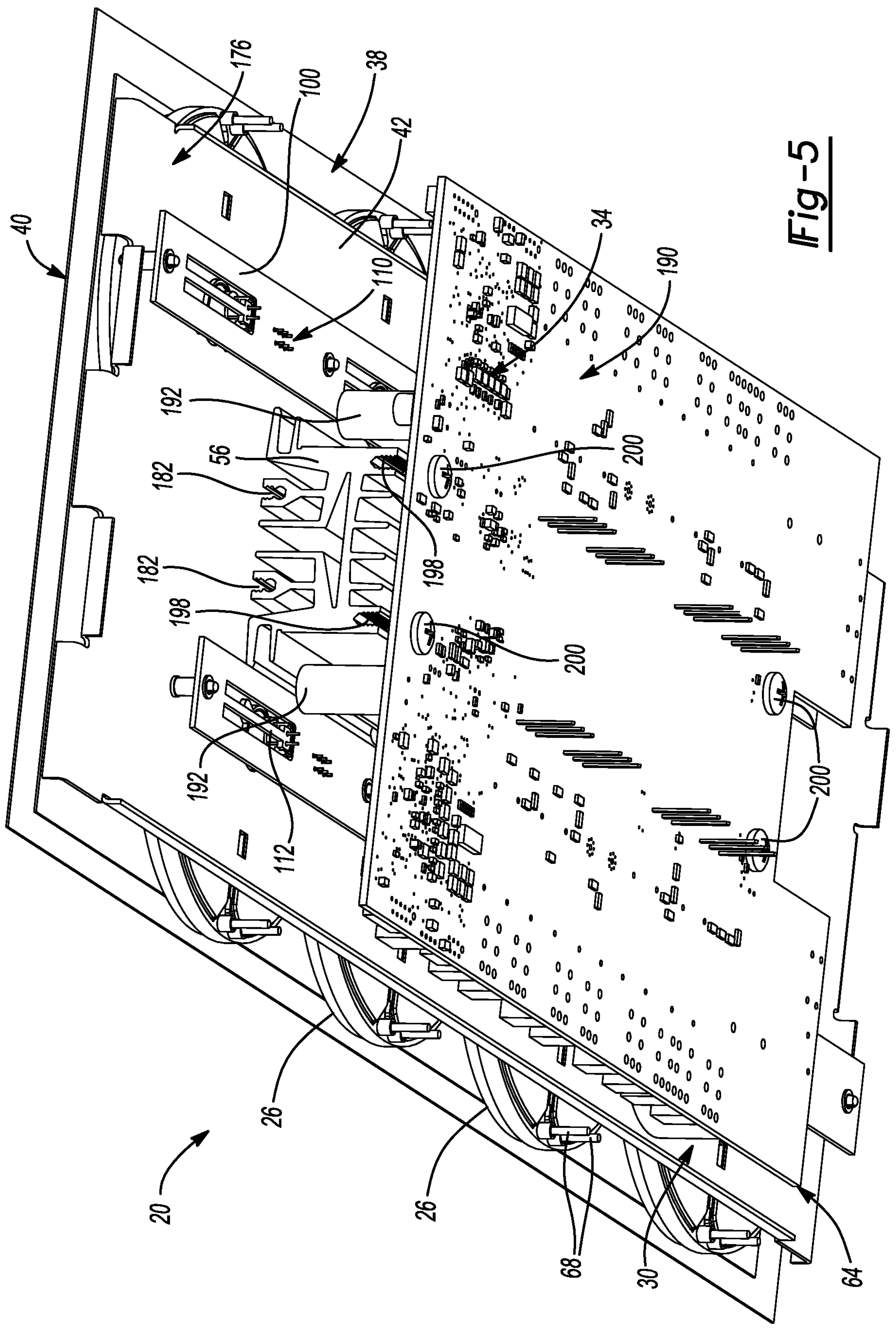
FIG. 5 is a bottom perspective view of the exemplary cooktop panel, inverter assembly, heatsink, and coil beam assembly illustrated in FIG. 3.

With further reference to FIGS. 4 and 5, the larger induction cooking apparatus 20 is illustrated, which includes the coil beam assembly 38, cooktop panel 40, inverter assembly 30, and burner sub-assembly 22. In accordance with some embodiments, each of the induction coils 26 included on one of the coil beam assemblies 38 is mounted above and supported on a beam 42 that extends horizontally/laterally across a burner box 44 of the cooktop 24 between a first beam end 46 and a second beam end 48. The beam 42 may be made from a variety of different materials; however, the beam 42 is preferably made of a non-ferromagnetic material like aluminum, for example, such that the beam 42 is not influenced by the induction coils 26 that it supports. Optionally, ferrite foils 50 may be positioned between each induction coil 26 and the beam 42 to direct the electromagnetic field up towards the cooking region 28.

Although other configurations are possible, the burner box 44 may include a bottom wall 52 and one or more side walls 54 that extend upwardly from the bottom wall 52. Accordingly, the burner box 44 may be substantially rectangular in form and may form an enclosure having an internal cavity configured to house various components of the cooktop 24, including the coil beam assemblies 38. The burner sub-assembly 22 is comprised of the inverter assembly 30, the coil beam assembly 38, and a heatsink 56 that is sandwiched between and attached to both the inverter assembly 30 and the coil beam assembly 38. The coil beam assembly 38 may be configured such that the beam 42 mounts to and is supported by the side walls 54 of the burner box 44. More specifically, the first and second beam ends 46, 48 may have tabs that engage opposing side walls 54 of the burner box 44 such that the inverter assembly 30 hangs from the beam 42 as a result of being fastened directly to and beneath the heatsink 56. In accordance with this design, the inverter assembly 30 is therefore suspended above (i.e., is vertically spaced above) the bottom wall 52 of the burner box 44 and is supported in the burner box 44 by the beam 42 and the heatsink 56. The typical plastic tray that attaches the inverter assembly 30 to the bottom wall 52 of the burner box 44 in typical induction cooktops is therefore eliminated in this design.

The coil beam assemblies 38 extend in complementary parallel groups beneath the cooktop panel 40. The cooktop panel 40 may be made of glass or a glass-ceramic material and includes an exterior surface 58 and an interior surface 60. Optionally, a mica sheet 62 may be provided between the interior surface 60 of the cooktop panel 40 and the induction coils 26 to provide insulation. The exterior surface 58 of the cooktop panel 40 is configured to support cookware 36 of various shapes and sizes and therefore acts as the cooking surface. The induction coils 26, together with the ferrite foils 50, concentrate a field of electromagnetic flux above the exterior surface 58 of the cooktop panel 40 in the cooking region(s) 28.

The inverter assembly 30 is positioned beneath the coil beam assembly 38. The inverter assembly 30 includes a first circuit board 64 that is electrically connected to the induction coils 26 in the coil beam assembly 38. The first circuit board 64 may be a printed circuit board (PCB) that includes the first electrical circuit 34, printed as conductive traces on the first circuit board 64. The first electrical circuit 34 of the inverter assembly 30 is configured to generate one or more high frequency switching signals. The switching signals cause the induction coils 26 to generate the electromagnetic field in cookware 36 placed on the exterior surface 58 of the cooktop panel 40. Due to this functionality, the inverter assembly 30 may also be referred to as simply an inverter or an induction power converter. The first electrical circuit 34 includes a plurality of conductive connections and is configured to communicate control signals and/or driving current to the induction coils 26. The conductive connections of the first electrical circuit 34 are arranged in electrical communication with the induction coils 26 via one or more electrical connectors 68 that are electrically connected to copper windings 70 forming the induction coils 26. The electrical connectors 68 may correspond to lead wires (as illustrated) that are soldered directly to the conductive connections of the first electrical circuit 34 or may be fast-connect terminals (e.g., "faston" connectors). If the latter option is utilized, the conductive connections of the first electrical circuit 34 may be configured as female terminals and the electrical connectors 68 on the induction coils 26 may be configured as male terminals or vice versa to establish an electrical connection between the first electrical circuit 34 on the first circuit board 64 and the induction coils 26.

The copper windings 70 of the induction coils 26 may be wound on coil formers 72. Each coil former 72 may be, for example, a plastic bobbin or housing. In some embodiments, the copper windings 70 of each induction coil 26 may be wound on one coil former 72. The power supply circuit 34 of the first circuit board 64 may extend along a length of the beam 42 such that the conductive contacts of the first electrical circuit 34 are aligned with the electrical connectors 68 on each induction coil 26. For example, in some embodiments, the induction coils 26 in each coil beam assembly 38 may share a single electrical circuit 34.

Although other configurations are possible, each induction coil 26 has a circular, disk-like shape and an opening 78 that is located at the center of the induction coil 26. The induction cooking apparatus 20 further includes a temperature sensor 80 for each induction coil 26 that is positioned in the opening 78 of the induction coil 26. A guiding support 82 is also positioned in the opening 78 of the induction coil 26. The temperature sensor 80 and the guiding support 82 are arranged in a clearance fit with one another and the opening 78 such that both the temperature sensor 80 and the guiding support 82 are free to move, slide, and tilt within the opening 78 in the induction coil 26. It should also be appreciated that both the beam 42 and the mica sheet 62 have apertures 84, 85 that are aligned with the openings 78 in the induction coils 26 through which the temperature sensor 80 may extend. The temperature sensors 80 may be, for example, negative temperature coefficient (NTC) sensors configured to adjust a resistance based on a temperature proximate to each temperature sensor 80. In operation, the temperature sensors 80 communicate temperature signals for the induction coils 26. These temperature signals are utilized for temperature control and regulation purposes.

The induction cooking apparatus 20 further includes a second circuit board 100, separate from the first circuit board 64, that is electrically connected to the temperature sensor(s) 80. In other words, the induction cooking apparatus 20 has a second, standalone circuit board 100. The second circuit board 100 is mounted above the first circuit board 64 and below the induction coil 26. More specifically, the second circuit board 100 is mounted below the beam 42 and is supported by the beam 42, which in turn is supported by the heatsink 56. In some embodiments, connection fixtures 102 are used to connect the second circuit board 100 to the beam 42. By way of example and without limitation, the connection fixtures 102 may extend upward from the second circuit board 100 and may be configured to engage holes 104 in the beam 42. In some embodiments, one of more spacers 106 may be disposed between the beam 42 and the second circuit board 100. The spacers 106 may be made from an electrically insulating material, such as plastic, for example. The second circuit board 100 may be a printed circuit board (PCB) that includes a second electrical circuit 110, printed as conductive traces on the second circuit board 100. The temperature sensor(s) 80 are electrically connected to the second electrical circuit 110. As such, the second electrical circuit 110 of the second circuit board 100 receives the temperature signals from the temperature sensor(s) 80. In some embodiments, the second electrical circuit 110 may be configured to process the temperature signals received from the temperature sensor(s) 80. In other embodiments, the second electrical circuit 110 may be configured to simply pass or transmit the temperature signals received from the temperature sensor(s) 80 to the inverter assembly 30. Accordingly, in various embodiments, the induction cooking apparatus 20 may include an electronic interface between the first circuit board 64 and the second circuit board 100 that is configured to pass signals (e.g. temperature signals) from the second circuit board 100 to the first circuit board 64.

The second circuit board 100 includes one or more cantilevered leaf-spring structures 112 that support the temperature sensors 80. Each cantilevered leaf-spring structure 112 that is integral with the second circuit board 100 and operates as a living hinge. The second circuit board 100 is made of a resilient material such that the cantilevered leaf-spring structure 112 can deflect or bend relative to the rest of the second circuit board 100. When the cooktop 24 is in a fully assembled state, the cantilevered leaf-spring structure 112 is downwardly flexed and applies a biasing force 126 to the temperature sensor 80 that is directed upwards towards the cooktop panel 40. In operation, this biasing force 126 holds the temperature sensor 80 flat against the interior surface 60 of the cooktop panel 40 for accurate temperature readings. Because the cantilevered leaf-spring structure 112 is flexible, it accounts for dimensional variations due to manufacturing tolerances and the thermal expansion and contraction of components of the cooktop 24, including during use.

The guiding support 82 is positioned in the opening 78 of the induction coil 26 with the temperature sensor 80. The guiding support 82, which may be made of plastic, includes a top end 146 that is disposed in contact with the temperature sensor 80 and a bottom end 148 that is disposed in contact with the cantilevered leaf-spring structure 112 of the second circuit board 100. As a result, the guiding support 82 is load bearing and is configured to transmit the biasing force 126 generated by deflection of the cantilevered leaf-spring structure 112 to the temperature sensor 80. The guiding support 82 is positioned in sliding engagement with the opening 78 in the induction coil 26 and there is a clearance fit between the guiding support 82 and the temperature sensor 80 and between the guiding support 82 and the opening 78 in the induction coil 26 such that the guiding support 82 is permitted to slide, tilt, and gimbal relative to the temperature sensor 80.

Figure 6:
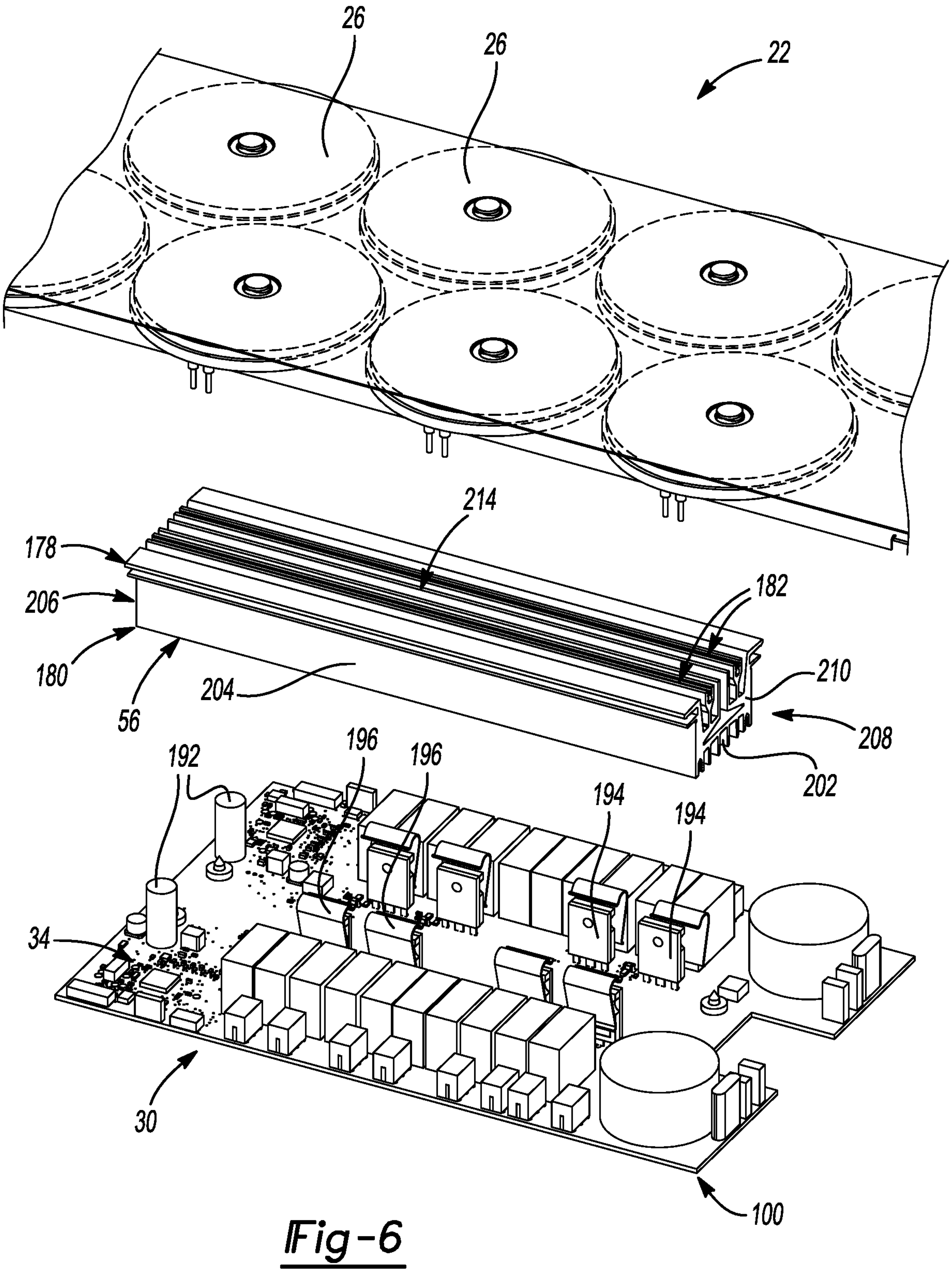
FIG. 6 is an exploded perspective view of the exemplary inverter assembly, heatsink and coil beam assembly illustrated in FIG. 3.
Figure 7:
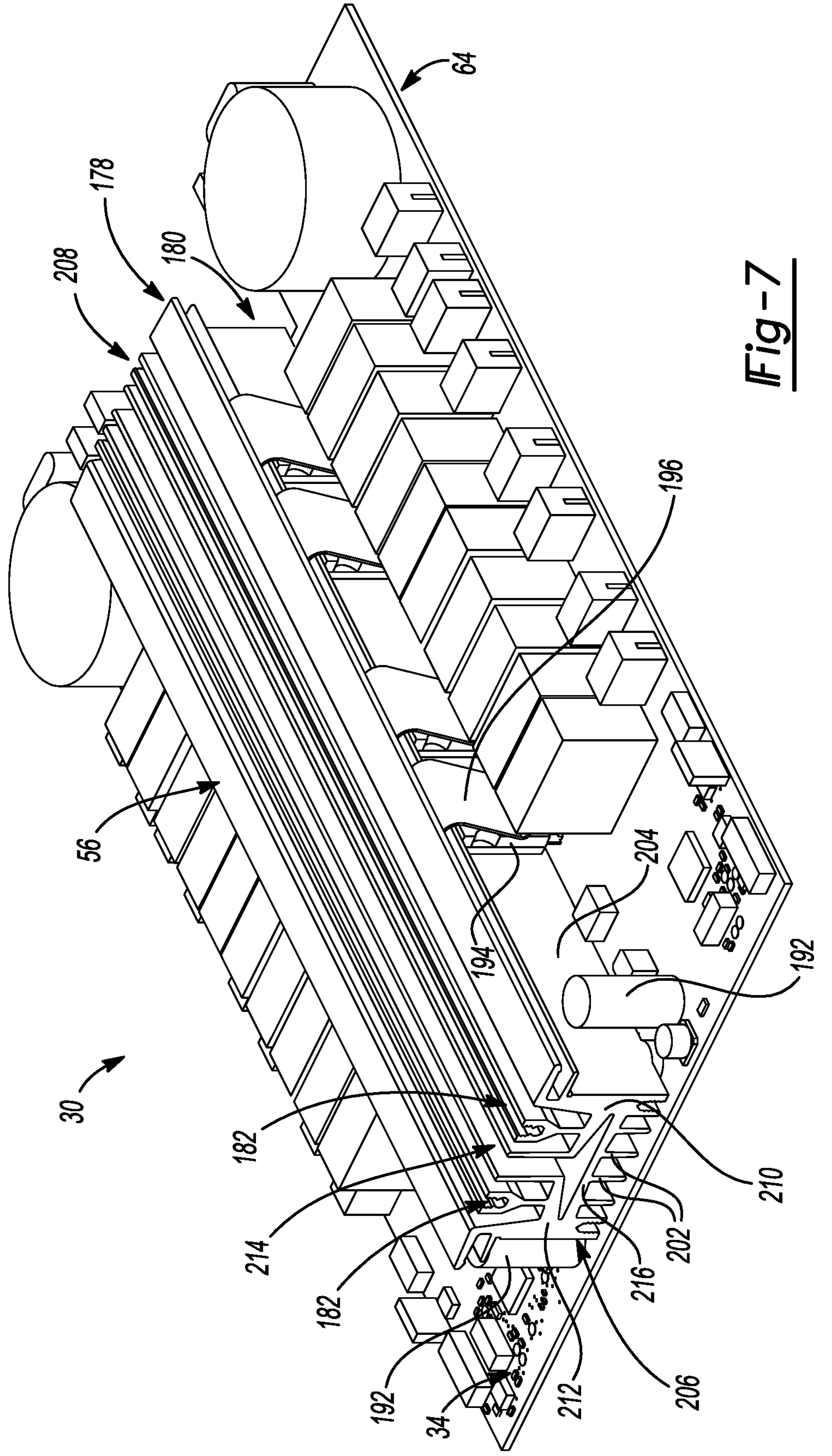
FIG. 7 is a top perspective view of the exemplary inverter assembly and heatsink illustrated in FIG. 3 where the heatsink is shown attached to the inverter assembly.
Figure 8:
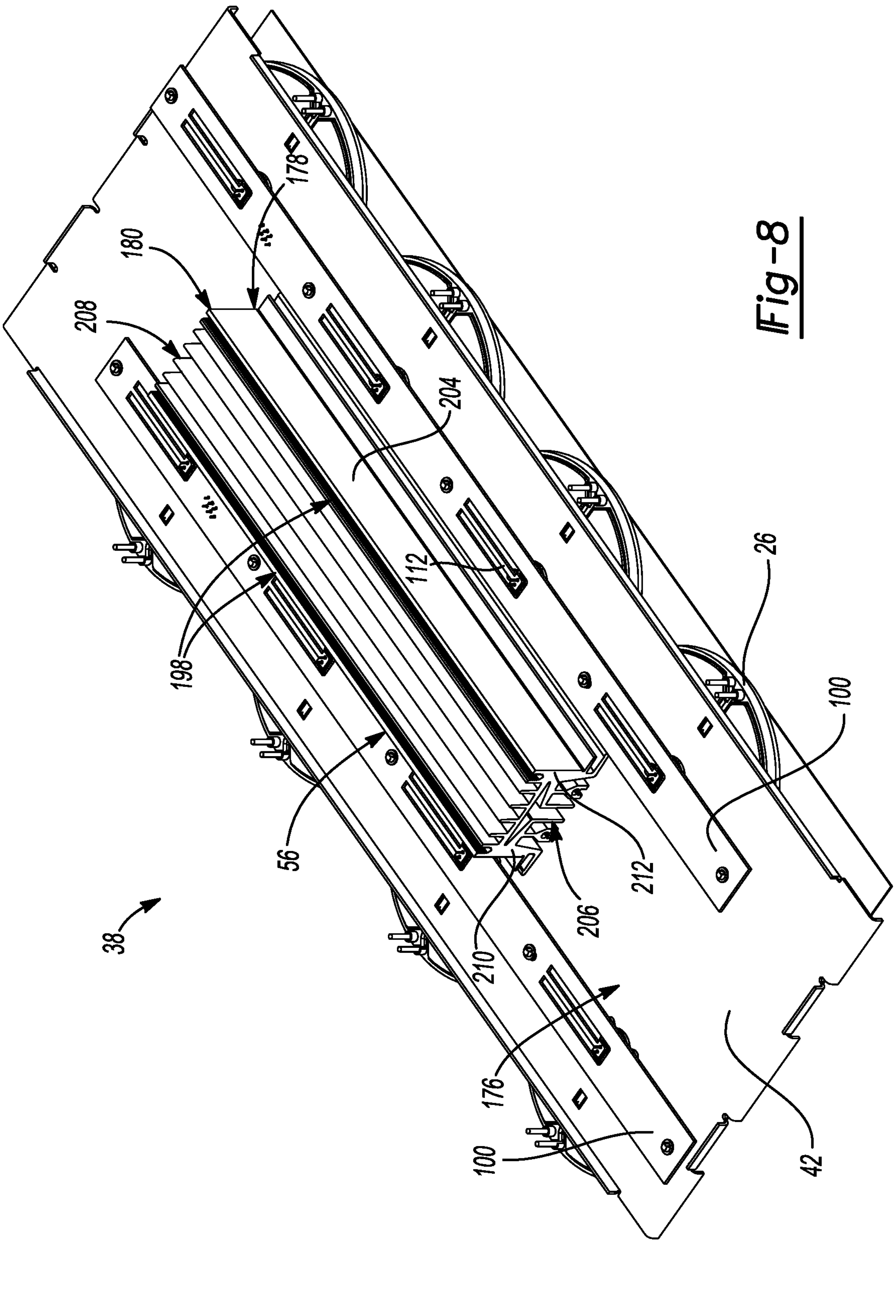
FIG. 8 is a bottom perspective view of the exemplary heatsink and coil beam assembly illustrated in FIG. 3 where the heatsink is shown attached to the coil beam assembly.

With additional reference to FIGS. 6-8, it can be seen that the heatsink 56 has a beam-like structure and is attached (directly fastened/fixed) to both the coil beam assembly 38 and the inverter assembly 30. More specifically, the heatsink 56 is positioned directly above the inverter assembly 30 and directly below the coil beam assembly 38 such that the heatsink 56 is the sole support structure for the inverter assembly 30 and is load bearing. The beam 42 includes a top surface 174 that supports the induction coils 26 and a bottom surface 176 that is directly fastened to the heatsink 56. The heatsink 56 extends vertically between an upper end 178 and a lower end 180. The upper end 178 of the heat sink 56 is positioned in abutting contact with the bottom surface 176 of the beam 42.

In the illustrated example, the upper end 178 of the heatsink 56 includes upper mounts 182 that receive a set of upper fasteners 184. The upper mounts 182 are provided in the form of a pair of longitudinal channels that are parallel to each other and run from the first beam end 46 to the second beam end 48. The upper fasteners 184 extend down through the beam 42 from the top surface 174 of the beam 42 and thread into the upper mounts 182 to fixably couple/attach the beam 42 to the heatsink 56. Optionally, one or more thermally insulating bodies 186 may be positioned between the heatsink 56 and the beam 42. The thermally insulating bodies 186, which may be provided in the form of washers, turrets, or similar structures, are made of a thermally insulating material, such as plastic, that reduces thermal conduction between the heatsink 56 and the beam 42. In addition, the upper fasteners 184, which may be provided in the form of screws, bolts, clips, rivets, pins, or similar structures, may be made of a thermally insulating material, such as plastic, to minimize thermal conduction from the beam 42 to the heatsink 56 through the upper fasteners 184.

The first circuit board 64 of the inverter assembly 30 includes an upper surface 188 and a lower surface 190. In the illustrated example, various electrical components and the heatsink 56 are directly fastened to the upper surface 188 of the first circuit board 64. For example, electrical components such as capacitors 192 and insulated-gate bipolar transistors (IGBTs) 194 may be arranged on the upper surface 188 of the first circuit board 64 in rows to either side of the heatsink 56. In addition, clips 196 may be used to hold the insulated-gate bipolar transistors 194 against sides of the heatsink 56 to ensure good thermal conduction and heat transfer away from the insulated-gate bipolar transistors 194.

The lower end 180 of the heatsink 56 is positioned in abutting contact with the upper surface 188 of the first circuit board 64. In the illustrated embodiment, the lower end 180 of the heatsink 56 includes one or more lower mounts 198 that receive a set of lower fasteners 200. The lower mounts 198 are provided in the form of a pair of longitudinal channels that are parallel to each other and run from the first beam end 46 to the second beam end 48. The lower fasteners 200 extend up through the first circuit board 64 from the lower surface 190 and thread into the lower mounts 198 to fixably couple the heatsink 56 to the first circuit board 64. As a result, the first circuit board 64 and the rest of the inverter assembly 30 are suspended vertically above the bottom wall 52 of the burner box 44. Optionally, one or more thermally insulating bodies 186 may also be positioned between the heatsink 56 and the first circuit board 64. The thermally insulating bodies 186, which may be provided in the form of washers, turrets, or similar structures, are made of a thermally insulating material, such as plastic, that reduces thermal conduction between the heatsink 56 and the first circuit board 64. In this way, the primary path of heat transfer from the inverter assembly 30 to the heatsink 56 occurs where heat flows from the insulated-gate bipolar transistors 194 to the heatsink 56. Like the upper fasteners 184, the lower fasteners 200 may be provided in the form of screws, bolts, clips, rivets, pins, or similar structures.

The heatsink 56 may generally be considered a rigid that is designed to resist bend when subjected to the thermal and physical loads typically experienced by a cooktop 24. As a result, problems where deflection of the beam 42 causes interference with the inverter assembly 30 are eliminated. In the illustrated example, the heatsink 56 includes a plurality of fins 202 that extend longitudinally along the heatsink 56 to provide a greater surface area for convective cooling. Of course, other fin configurations, including the use of vertically extending fins may be used. In addition, one or more fans (not shown) may be added to the induction cooking apparatus 20 to increase the amount of heat the heatsink 56 can effectively dissipate over any given time period. Like the beam 42, the heatsink 56 may be made from a variety of different materials; however, the heatsink 56 is preferably made of a non-ferromagnetic material that has a high thermal conductivity, like aluminum, for example. These characteristics allow the heatsink 56 to pull heat away from the inverter assembly 30 through thermal conduction and then dissipate that heat to the surrounding environment through thermal convection without being influenced by the magnetic fields generated by the induction coils 26.

It should be appreciated that the upper and lower mounts 182, 198 could take different forms from those described herein. By way of example and without limitation, the upper and lower mounts 182, 198 could alternatively be holes or threaded bores in the heatsink 56. It should also be appreciated that the inverter assembly 30 and/or the coil beam assembly 38 may be fixably coupled or attached to the heatsink 56 in alternative ways, such as by soldering or adhesive for example, without departing from the scope of the present disclosure.

The heatsink 56 includes a body portion 204 that extends longitudinally between first and second heatsink ends 206, 208. As best seen in FIGS. 4 and 7, the body portion 204 of the heatsink 56 may include first and second longitudinal segments 210, 212 that run parallel to each other on either side of a middle channel 214. Each of the first and second longitudinal segments 210, 212 includes one of the upper mounts 182 and one of the lower mounts 198. As such, each of the first and second longitudinal segments 210, 212 extends vertically from the first circuit board 64 of the inverter assembly 30 to the beam 42 of the coil beam assembly 38, abutting each of these structures at the top and bottom to create a vertically oriented load path between the inverter assembly 30 and the coil beam assembly 38. The insulated-gate bipolar transistors 194 abut each of the first and second longitudinal segments 210, 212 along one side, opposite the middle channel 214. The middle channel 214 terminates at a thermal bridge portion 216 of the heatsink 56, that extends laterally between first and second longitudinal segments 210, 212. The thermal bridge portion 216 helps to evenly distribute heat between the first and second longitudinal segments 210, 212 of the heatsink 56 by thermal conduction.

In the illustrated example, the first circuit board 64 is configured to be mounted to and supported by the heatsink 56 such that the lower surface 190 of the first circuit board 64 is spaced vertically above the bottom wall 52 of the burner box 44. In other words, the inverter assembly 30, including the first circuit board 64, may be directly mounted to and is solely supported by the heatsink 56 with screws, bolts, rivets, pins, clips, adhesive, or other fastening structures or methods, eliminating the need for a plastic support tray. In this way, the heatsink 56 is the sole structure that supports the inverter assembly 30 within the burner box 44 at a position that is spaced below the cooktop panel 40, which may be supported by one or more of the side walls 54 of the burner box 44.

Figure 9:
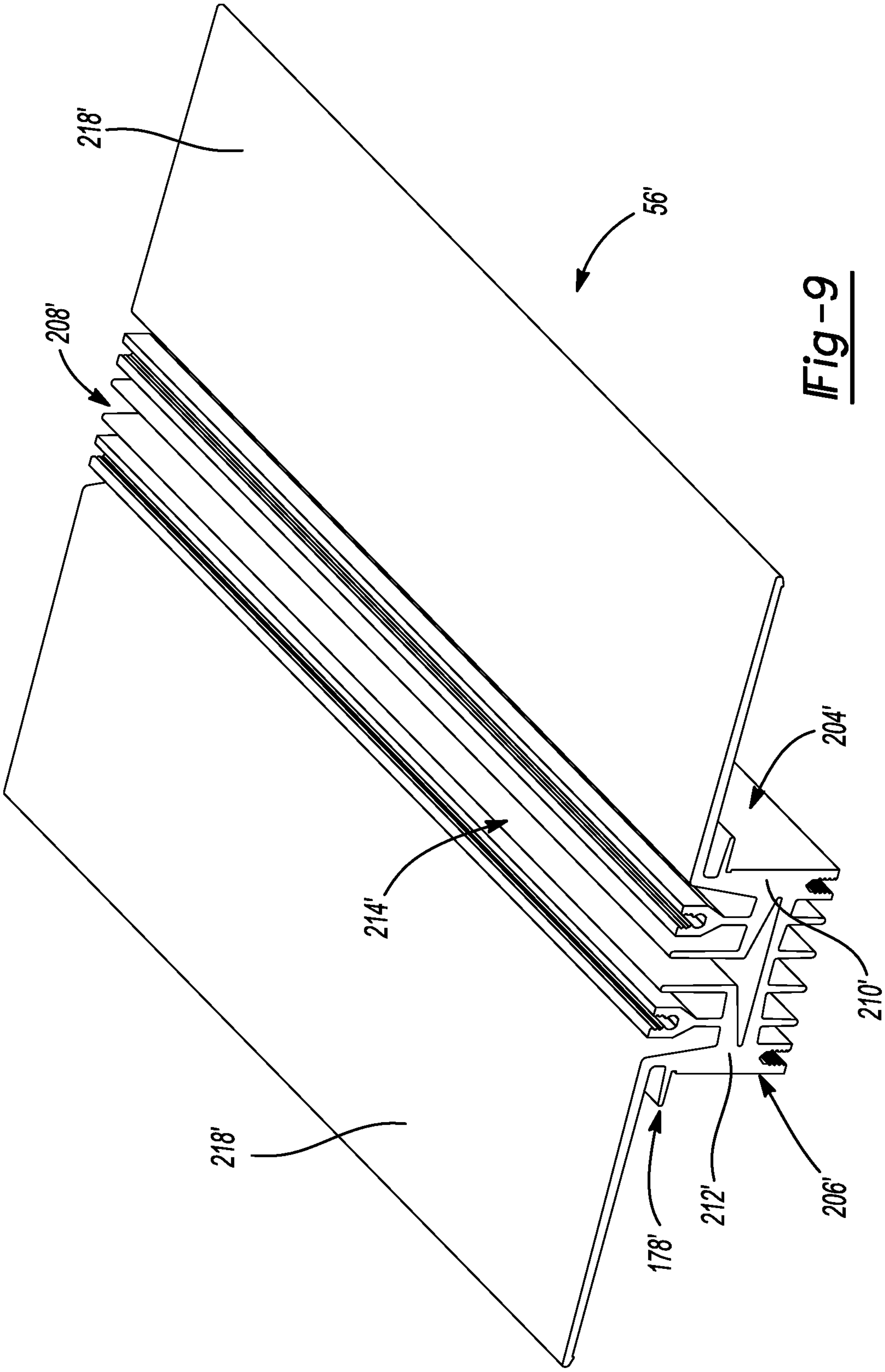
FIG. 9 is a top perspective view of another exemplary heatsink that is constructed in accordance with the present disclosure.

FIG. 9 illustrates an alternative heatsink 56' configuration having a body portion 204' that extends longitudinally between first and second heatsink ends 206', 208' and an upper end 178' that includes one or more flanges 218'. In the illustrated example, the upper end 178' of the heatsink 56' has two flanges 218' that extend laterally (i.e., horizontally) out from first and second longitudinal segments 210', 212' of the body portion 204' in opposite directions away from middle channel 214'. The extra surface area provided by the flanges 218' at the upper end 178' of the heatsink 56' allows the induction coils 26 to be positioned in abutting contact with and supported on the flanges 218'. In this way, the beam 42 described in the previous embodiment can be eliminated.

Figure 10:
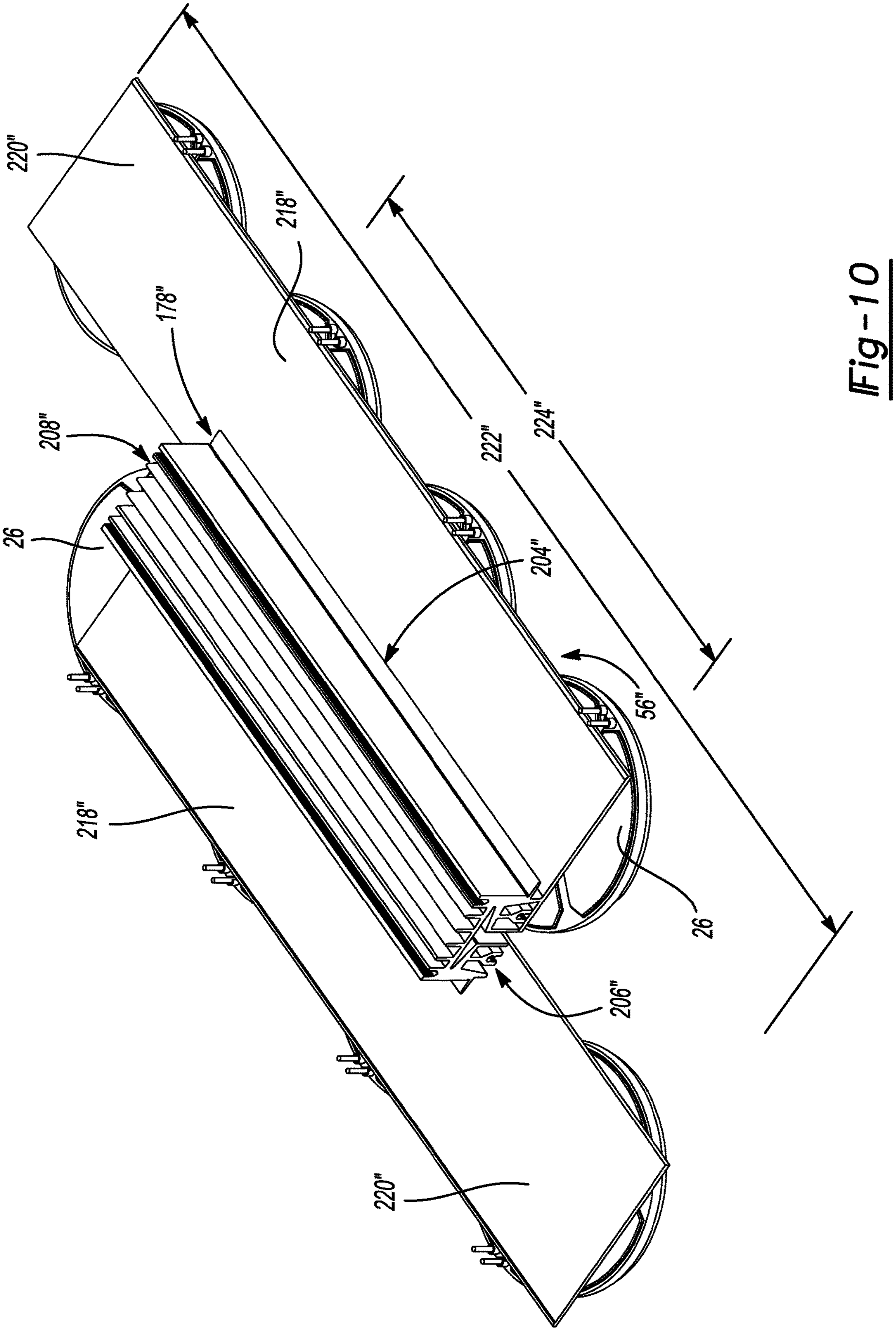
FIG. 10 is a bottom perspective view of another exemplary heatsink that is attached to another exemplary coil beam assembly.
Figure 11:
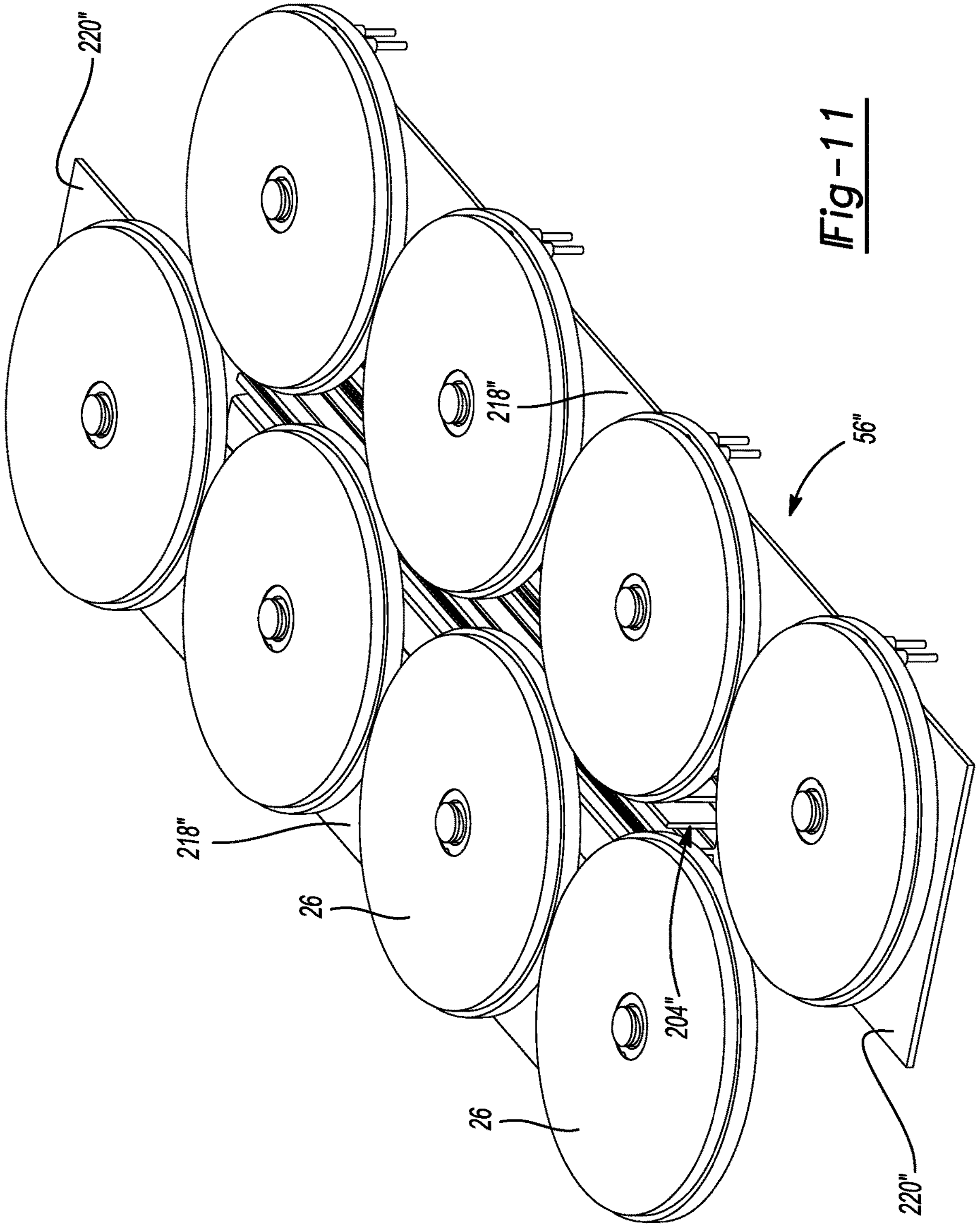
FIG. 11 is a top perspective view of the exemplary heatsink and coil beam assembly illustrated in FIG. 10.

FIGS. 9, 10 and 11 illustrate another alternative heatsink 56" configuration with flanges 218" at the upper end 178" of the heatsink 56". Like in the previous configuration, the upper end 178" of the heatsink 56" in this example has two flanges 218" that extend laterally (i.e., horizontally) out from the body portion 204" in opposite directions. However, in this example, the flanges 218" include extension portions 220" that extend longitudinally in opposite directions beyond the first and second heatsink ends 206', 208'. The extension portions 220" may either be made integral with the flanges 218" as shown or made as separate structures that are fixedly attached to the flanges 218". The induction coils 26 are positioned in abutting contact with and are supported on the flanges 218" and the extension portions 220". Again, the beam 42 described in the previous embodiment can be eliminated and the extra surface area provided by the extension portions 220" allows the induction coils 26 to be arranged on the heatsink 56" in a staggered configuration and the heatsink 56" to have a reduced longitudinal length 222" that is less than an overall longitudinal length 224" of the coil beam assembly 38".

The induction cooking apparatus 20 described above is easier and quicker to assemble than traditional induction cooktops. For example, the induction cooking apparatus 20 may be assembled according to the method described below. The method begins with the steps of: fixably mounting the lower end 180 of the heatsink 56 to the inverter assembly 30 and fixably mounting the coil beam assembly 38 to the upper end 178 of the heatsink 56. These steps are carried out such that the heatsink 56 is load bearing (i.e., acts as a load bearing member in the burner sub-assembly 22) and is the sole support structure for the inverter assembly 30. The method then proceeds with the steps of electrically connecting the induction coil(s) 26 to the inverter assembly 30, installing the coil beam assembly 38, inverter assembly 30, and heatsink 56 together as one burner sub-assembly 22 in the burner box 44, where the first and second beam ends 46,

48 engage the side walls 54 of the burner box 44 such that the burner sub-assembly 22, including the inverter assembly 30, is suspended vertically above the bottom wall 52 of the burner box 44. The method then involves installing the cooktop panel 40 over the burner box 44 and the burner sub-assembly 22 at a position above the induction coil(s) 26. The method may further include the step of thermally insulating one or more mounting points between the coil beam assembly 38 and the upper end 178 of the heatsink 56, such as for example, placing the thermally insulating bodies 186 described above between the upper mounts 182 of the heatsink 56 and the coil beam assembly 38 and/or between the inverter assembly 30 and the lower end 180 of the heatsink 56, such as for example, placing the thermally insulating bodies 186 described above between the lower mounts 198 of the heatsink 56 and the inverter assembly 30. This method provides a manufacturing advantage because the inverter assembly 30 and the coil-beam assembly 38 can be pre-assembled as a burner sub-assembly 22, which can then be lowered (i.e., dropped into) the burner box 44 without needing precise alignment since the electrical connections between the inverter assembly 30 and the coil-beam assembly 38 have already been made prior to this installation step.

Many modifications and variations of the apparatus and assemblies described in the present disclosure are possible in light of the above teachings and may be practiced other than as specifically described while within the scope of the appended claims. These antecedent recitations should be interpreted to cover any combination in which the inventive novelty exercises its utility. In addition, the reference numerals in the claims are merely for convenience and are not to be read in any way as limiting.

What is claimed is:

1. An induction cooking apparatus comprising:

a coil beam assembly including a beam with a top surface that supports a plurality of induction coils;

an inverter assembly including a first circuit board that is electrically connected to said induction coil and that is configured to supply electricity to said induction coil;

a heatsink, having a beam-like structure, that is attached to both said coil beam assembly and said inverter assembly such that said heatsink is positioned above said inverter assembly and below said coil beam assembly; and a second circuit board that is mounted below said beam and is supported by said beam at a position that is above said first circuit board and below said induction coils, said second circuit board including a temperature sensor for each of said induction coils, wherein said inverter assembly is mounted beneath said heatsink such that said heatsink is the sole support structure for said inverter assembly and is load bearing.

2. The induction cooking apparatus as set forth in claim 1, wherein said beam of said coil beam assembly includes a bottom surface that is directly fastened to said heatsink and wherein a plurality of connection fixtures extend upward from said second circuit board to said bottom surface of said beam to connect said second circuit board to said beam.

3. The induction cooking apparatus as set forth in claim 2, wherein said heatsink includes an upper end that is positioned in abutting contact with said bottom surface of said beam.

4. The induction cooking apparatus as set forth in claim 3, wherein said upper end of said heatsink includes at least one upper mount that receives at least one upper fastener that fixably couples said beam to said heatsink.

5. The induction cooking apparatus as set forth in claim 4, wherein said at least one upper mount is a longitudinal channel in said upper end of said heatsink.

6. The induction cooking apparatus as set forth in claim 4, wherein said at least one upper mount includes a pair of longitudinal channels in said upper end of said heatsink that run parallel to one another.

7. The induction cooking apparatus as set forth in claim 2, further comprising:

at least one thermally insulating body sandwiched between and directly abutting both said heatsink and said beam, wherein said at least one thermally insulating body is made of a thermally insulating material that reduces heat conduction between said heatsink and said beam.

8. The induction cooking apparatus as set forth in claim 1, wherein said first circuit board of said inverter assembly includes an upper surface and a lower surface and wherein said heatsink is directly fastened to said upper surface of said first circuit board.

9. The induction cooking apparatus as set forth in claim 8, wherein said heatsink includes a lower end that is positioned in abutting contact with said upper surface of said first circuit board.

10. The induction cooking apparatus as set forth in claim 9, wherein said lower end of said heatsink includes at least one lower mount that receives at least one lower fastener that fixably couples said heatsink to said first circuit board.

11. The induction cooking apparatus as set forth in claim 10, wherein said at least one lower mount is a longitudinal channel in said lower end of said heatsink.

12. The induction cooking apparatus as set forth in claim 10, wherein said at least one lower mount includes a pair of longitudinal channels in said lower end of said heatsink that run parallel to one another.

13. The induction cooking apparatus as set forth in claim 1, further comprising:

a burner box having a bottom wall and side walls, wherein said beam extends longitudinally between a first beam end and a second beam end, wherein said first and second beam ends are supported by said side walls of said burner box, wherein said first circuit board of said inverter assembly is mounted to and supported by said heatsink at a position that is spaced vertically above said bottom wall of said burner box.

14. The induction cooking apparatus as set forth in claim 13, further comprising:

a cooktop panel, positioned above said coil beam assembly, that extends across said burner box, wherein said side walls support said cooktop panel.

15. An induction cooking apparatus comprising:

a coil beam assembly including a beam that supports a plurality of induction coils;

an inverter assembly including a first circuit board that is electrically connected to said induction coils and that is configured to supply electricity to said induction coils;

a heatsink, having a beam-like structure and a plurality of fins, that is attached to both said beam and said inverter assembly such that said heatsink is positioned above said inverter assembly and below said coil beam assembly; and a second circuit board that is mounted below said beam and is supported by said beam at a position that is above said first circuit board and below said induction coils, said second circuit board including a temperature sensor for each of said induction coils, wherein said inverter assembly is mounted beneath said heatsink such that said heatsink is the sole support structure for said coil beam assembly and is load bearing.

16. The induction cooking apparatus as set forth in claim 15, wherein said heatsink includes a lower end that is positioned in abutting contact with said first circuit board and an upper end that is positioned in abutting contact with said coil beam assembly, said upper end of said heatsink including at least one flange.

17. The induction cooking apparatus as set forth in claim 16, wherein said heatsink includes a body portion that extends longitudinally between first and second heatsink ends and said flange includes at least one extension portion that extends longitudinally beyond said first or second heatsink end.

18. The induction cooking apparatus as set forth in claim 15, wherein said beam of said coil beam assembly includes a top surface that supports said induction coils and a bottom surface that is directly fastened to said heatsink and wherein a plurality of connection fixtures extend upward from said second circuit board to said bottom surface of said beam to connect said second circuit board to said beam.

19. A method for assembling an induction cooking apparatus, the method comprising the steps of:

fixably mounting a coil beam assembly, having a beam with a top surface that supports a plurality of induction coils, to an upper end of a heatsink that has a beam-like structure;

fixably mounting a lower end of the heatsink to an inverter assembly having a first circuit board such that the heatsink is the sole support structure for the inverter assembly and is load bearing;

electrically connecting the induction coils to the first circuit board of the inverter assembly;

electrically connecting a plurality of temperature sensors to a second circuit board that is separate from the first circuit board of the inverter assembly;

fixably mounting the second circuit board to the beam of the coil beam assembly at a position below a bottom surface of the beam and above the first circuit board of the inverter assembly;

installing the coil beam assembly, inverter assembly, and heatsink as a burner sub-assembly in a burner box such that the inverter assembly is suspended above a bottom wall of the burner box; and installing a cooktop panel over the burner box and the burner sub-assembly at a position above the at least one induction coil.

20. The method as set forth in claim 19, further comprising the steps of:

thermally insulating one or more mounting points between the heatsink and at least one of the coil beam assembly and the inverter assembly.

* * * * *